US009499087B2

(12) United States Patent
Freitag et al.

(10) Patent No.: US 9,499,087 B2
(45) Date of Patent: Nov. 22, 2016

(54) SELF-CONTAINMENT FOR MACHINERY

(71) Applicant: KAMAC INC., Cleveland, OH (US)

(72) Inventors: David Freitag, Rocky River, OH (US); Phillip L. Bowman, Burton, OH (US)

(73) Assignee: Kamac Inc., Cleveland, OH (US)

( * ) Notice: Subject to any disclaimer, the term of this patent is extended or adjusted under 35 U.S.C. 154(b) by 0 days.

(21) Appl. No.: 14/261,380

(22) Filed: Apr. 24, 2014

(65) Prior Publication Data

US 2014/0319866 A1     Oct. 30, 2014

Related U.S. Application Data

(60) Provisional application No. 61/815,504, filed on Apr. 24, 2013.

(51) Int. Cl.
*B60P 3/22*     (2006.01)

(52) U.S. Cl.
CPC .............. *B60P 3/228* (2013.01); *B60P 3/224* (2013.01)

(58) Field of Classification Search
CPC ............. B60P 3/14; B60P 3/22; B60P 3/2235
USPC .............................. 296/38, 24.3, 24.4, 97.22
See application file for complete search history.

(56) References Cited

U.S. PATENT DOCUMENTS

| | | | |
|---|---|---|---|
| 2,567,164 A * | 9/1951 | Brehany et al. | ............... 280/839 |
| D243,093 S | 1/1977 | Reynolds | |
| D269,420 S | 6/1983 | McClure, Jr. | |
| D307,016 S | 4/1990 | Watanabe | |
| 5,071,166 A * | 12/1991 | Marino | ......................... 280/830 |
| D325,549 S | 4/1992 | Jarvis | |
| D335,267 S | 5/1993 | Upshaw | |
| D352,722 S | 11/1994 | Mandell et al. | |
| D358,698 S | 5/1995 | Henry | |
| 5,419,400 A * | 5/1995 | Wigington, Sr. | ....... E21B 21/01 |
| | | | 166/379 |
| D376,462 S | 12/1996 | Lanigan, Sr. | |
| D390,167 S | 2/1998 | Dionisio | |
| D418,451 S | 1/2000 | Konecheck | |
| D471,845 S | 3/2003 | Mighell | |
| 6,701,776 B2 * | 3/2004 | Stetter | ............................ 73/49.2 |
| D513,717 S | 1/2006 | Wittkowski | |
| D515,464 S | 2/2006 | DeShong | |
| D522,409 S | 6/2006 | Wittkowski | |
| D524,202 S | 7/2006 | Devitt | |
| D524,695 S | 7/2006 | Manchik | |
| D530,242 S | 10/2006 | Prusmack | |
| D545,253 S | 6/2007 | Jones | |
| D546,253 S | 7/2007 | Lee | |
| D549,624 S | 8/2007 | Jones | |

(Continued)

*Primary Examiner* — Jason S Morrow
*Assistant Examiner* — E Turner Hicks
(74) *Attorney, Agent, or Firm* — Tucker Ellis LLP; Carlos Garritano

(57) ABSTRACT

Systems and methods of the invention relate to containing a portion of liquid associated with a diesel machine (e.g., combustion fuel machine, and the like) used in an outside environment. A diesel machine and an associated fuel storage can be contained within a self containment device that prevents liquid(s) to be exposed to an outside environment such as, but not limited to, a ground, a soil, a water source, vegetation, plant, trees, and the like. The self containment device is a liquid-proof (e.g., no leakage) containment that can house a portion of liquid from at least one of the diesel machine, the fuel storage, or any other suitable feature used with the diesel machine and/or fuel storage.

20 Claims, 6 Drawing Sheets

(56) References Cited

U.S. PATENT DOCUMENTS

| | | | |
|---|---|---|---|
| 7,293,802 B2* | 11/2007 | Bachman et al. | 280/839 |
| D557,432 S | 12/2007 | Smith | |
| 7,371,038 B2* | 5/2008 | Tuvim | 414/459 |
| D594,387 S | 6/2009 | Seidenberg | |
| D619,933 S | 7/2010 | McIntosh et al. | |
| D695,647 S | 12/2013 | Manley | |
| D703,106 S | 4/2014 | Deighton | |
| D706,175 S | 6/2014 | Graham, II | |
| D706,686 S | 6/2014 | Guetersloh | |
| 2012/0022768 A1* | 1/2012 | Johnson et al. | 701/103 |
| 2013/0085652 A1* | 4/2013 | McGuffin | 701/101 |

* cited by examiner

SELF-CONTAINMENT FOR MACHINERY

CROSS-REFERENCE TO RELATED APPLICATIONS

This application claims the benefit of priority to U.S. Provisional Application Ser. No. 61/815,504, filed Apr. 24, 2013, and entitled "SELF-CONTAINMENT FOR DIESEL MACHINERY." The entirety of the aforementioned application is incorporated herein by reference.

BACKGROUND

1. Technical Field

Embodiments of the subject matter disclosed herein relate to a device that captures leakage of a liquid or material from a machine and/or a fuel storage.

2. Discussion of Art

It may be desirable to have a system and method for preventing harmful contamination of the environment when using machinery that differs from those systems and methods that are currently available.

BRIEF DESCRIPTION

In an embodiment, a system is provided that facilitates containing a liquid from a machine, in which the system includes a fuel storage with a volume that houses a portion of fuel and a machine that utilizes the portion of fuel. With the embodiment, the system includes a fuel line that communicates the portion of fuel from the fuel storage to the machine. With the embodiment, the system includes a self containment device that is leak-proof and houses the fuel storage and the machine such that a liquid from at least one of the machine or the fuel storage is contained therein.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
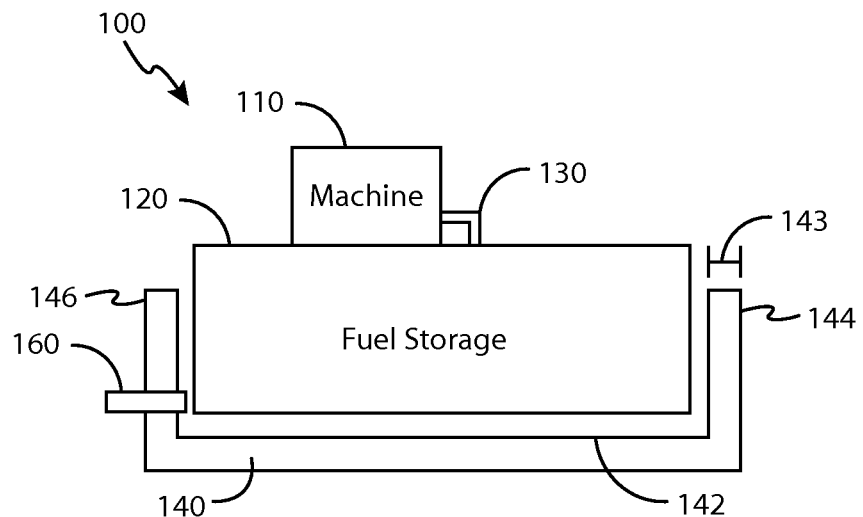
FIG. 1 is an illustration of cross-section of an embodiment of a system for containing a portion of liquid to protect an outside environment.

Embodiments of the invention relate to methods and systems for containing a portion of liquid associated with a machine (e.g., combustion fuel machine, and the like) used in an outside environment. A machine and an associated fuel storage can be contained within a self containment device that prevents liquid(s) to be exposed to an outside environment such as, but not limited to, a ground, a soil, a water source, vegetation, plant, trees, and the like. The self containment device is a liquid-proof (e.g., no leakage) device that can house a portion of liquid that may originate from at least one of the machine, a combustion fuel machine, the fuel storage, or any other suitable feature used with the machine and/or fuel storage. By way of example, but not limitation, the portion of liquid can be diesel fuel, gasoline, oil, battery fluid (e.g., electrolyte solution, sulfuric acid, water, among others), transmission fluid, coolant, lubricant, hydraulic fluid, grease, compressed natural gas, among others. It is to be appreciated that a machine is used to describe any suitable machine that can potentially harm an outside environment with a liquid used to run. For instance, a gasoline engine is considered to be within the scope of the subject innovation and the subject innovation is not limited to a machine that uses diesel fuel. By way of example and not limitation, the machine can be a pump, a generator, a diesel fuel machine, a gasoline machine, an engine, a motor, a machine powered by an energy storage device, a machine powered by a gas (e.g., compressed natural gas, and the like) among others. In other words, any machine or device that uses a portion of liquid that can be harmful or dangerous for an outside environment can be utilized with the self containment device.

Techniques often require a fuel burning machines to be contained within a stationary, non-integrated, confinement area that protects the ground and other outside environment elements (e.g., water sources, trees, plants, vegetation, among others). Such stationary confinement areas are defined as a "secondary confinement" and are stationed at specific locations where a machine is to be used. In a particular example, hydraulic fracturing is the propagation of fractures in a rock layer by a pressurized fluid and often uses various machines to perform. Induced hydraulic fracturing or hydrofracturing (also referred to as fracking) is a technique used to release petroleum, natural gas (including shale gas, tight gas, and coal seam gas), or other substances for extraction. With fracking, machines such as diesel machines, diesel pumps, etc. are used at various locations. In particular, a water pump is placed at a water source to pump water to another location, wherein at the water source a secondary confinement is built. The secondary confinement for these machines are costly and insecure for leakage protection due to the stationary aspects, constant exposure to weather elements, and infrequent or non-existent inspections. In particular, the Environment Protection Agency (EPA) enforces for the use of secondary containment when using a machine. The subject innovation provides a self-contained system that allows use of a machine without the use of a secondary containment while still providing protection to the outside environment from liquid spills. Moreover, the subject innovation allows use of a secondary containment or a self containment device.

With reference to the drawings, like reference numerals designate identical or corresponding parts throughout the several views. However, the inclusion of like elements in different views does not mean a given embodiment necessarily includes such elements or that all embodiments of the invention include such elements.

The term "machine" as used herein can be defined as a machine that consumes or uses a material that may be harmful to the outside environment if exposed to at least one of the ground, soil, air, vegetation, plants, trees, human respiratory system, a portion of a human (e.g., eye, skin, body part, etc.), among others. In general, a machine can be any device that uses a liquid, solid, or material that is desired to be contained within the machine. Thus, a machine can include a gasoline machine or a diesel machine. The type of machine used with the fuel storage and self containment device discussed below is not to be limiting on the subject innovation. By way of example and not limitation, the machine can be a pump, a generator, a diesel fuel machine, a gasoline machine, an engine, a motor, a machine powered by an energy storage device, a machine powered by a compressed natural gas, among others.

The term "component" as used herein can be defined as a portion of hardware, a portion of software, or a combination thereof. A portion of hardware can include at least a processor and a portion of memory, wherein the memory includes an instruction to execute.

FIG. 1 is a system 100 for containing a portion of liquid to protect an outside environment. The system 100 is a cross-sectional view of a machine 110 and a fuel storage 120 connected via a fuel line 130. It is to be appreciated that the machine 110 consumes a portion of liquid housed by the fuel storage 120 in order to run or operate. As discussed above, the machine 110 can be any suitable machine that consumes or uses a material (e.g., liquid, solid, semi-liquid, plasma, and the like) that is harmful to an outside environment (e.g., soil, ground, air, plant, trees, water source, among others) or a portion of a human (e.g., eye, body part, skin, respiratory system, etc.). The machine 110 can consume or utilize additional liquids other than the fuel housed by the fuel storage 120. For instance, the machine 110 can use or consume oil, grease, lubricants, and the like. The system 100 further includes a self containment device 140 that houses the machine 110, the fuel storage 120, and the fuel line 130. The self containment device 140 is a leak-proof container that prevents a portion of liquid or material from exiting therefrom, if the portion of liquid or material leaks or exits the diesel machine 110. In other words, the self containment device 140 is impermeable to liquid, material, solid, or waste from the machine 110.

In particular, the self containment device 140 captures liquid or material from the fuel storage 120 and/or the machine 110 in the event of a leak, spill, failure, refueling, refilling, maintenance work, repair, among others. For instance, an oil leak from the machine 110 is contained and housed in the self containment device 140. In another example, a leak from the fuel storage 120 and/or the fuel line 130 is captured and maintained by the self containment device 140. In still another example, the leak or spill can be due to a refueling of the portion of liquid (e.g., spill or leak from a human refueling or a machine refueling, etc.). In still another example, the self containment device 140 can capture and prevent a portion of liquid from the machine 110 during a maintenance or repair of the diesel machine 110. For example, while changing oil in the machine 110, the self containment device 140 will prevent the oil from being in contact with the environment exterior to the system 100.

The fuel storage 120 has a volume and can be any suitable shape or size. The volume of fuel storage 120 can be an amount to allow the machine 110 to run for approximately 24 hours. The fuel storage 120 can include a fuel port, wherein the fuel port includes a removeably attached cap. By way of example, the fuel storage 120 can include on one or more vents. In a specific embodiment, the fuel storage 120 can include one or more vents and/or one or more intakes to allow for delivery of fuel to the machine 110. For instance, the fuel port can be a cylinder and approximately between 1.5 inches to 5.5 inches in diameter. In an embodiment, the fuel port on the fuel storage is 4 inches in diameter. In an example, the fuel storage 120 can include a pump to facilitate deliver of fuel to the machine 110.

It is to be appreciated that the cross-sectional view illustrated in system 100 is solely for example and any suitable shape or size of the self containment device 140 can be employed. By way of example and not limitation, the shape of the self containment device 140 can be a rectangle, a square, a polygon, an octagon, a triangle, a circle, an oval, a rounded square, a rounded rectangle, a pentagon, a hexagon, a rounded polygon, and the like. It is to be appreciated that the shape and size of the self containment device 140 can be selected by one of sound engineering judgment and/or ordinary skill without departing from the scope of the subject innovation. For instance, a shape or size that holds a volume can be the self containment device 140, wherein such shape or size surrounds at least one of the machine 110 and/or the fuel storage 120.

For instance, the self containment device 140 can be substantially enclosed to house the machine 110, the fuel storage 120, and/or the fuel line 130. In another example, the self containment device 140 can include one or more splash guard components (discussed in more detail below) to prevent spill or leak over a sidewall of the self containment device 140. The system 100 can further include a drain 160 that allows controlled removal of a portion of material or liquid captured by the self containment device 140. For instance, the drain 160 can be manually controlled, automatically controlled (e.g., solenoid valve, controlled via an electronic signal, or a combination thereof).

In an embodiment, the drain 160 can be controlled by a control component (discussed in more detail below) and/or an input/output of one or more sensors that detect a parameter. For instance, the parameter can be, but is not limited to, an amount of liquid, a type of liquid, a time of day, a date, a volume of liquid, a weight of a liquid, a user input (e.g., button, motion, switch, voice command, keypad entry, electronic signal, wireless signal, among others), and the like.

Figure 4:
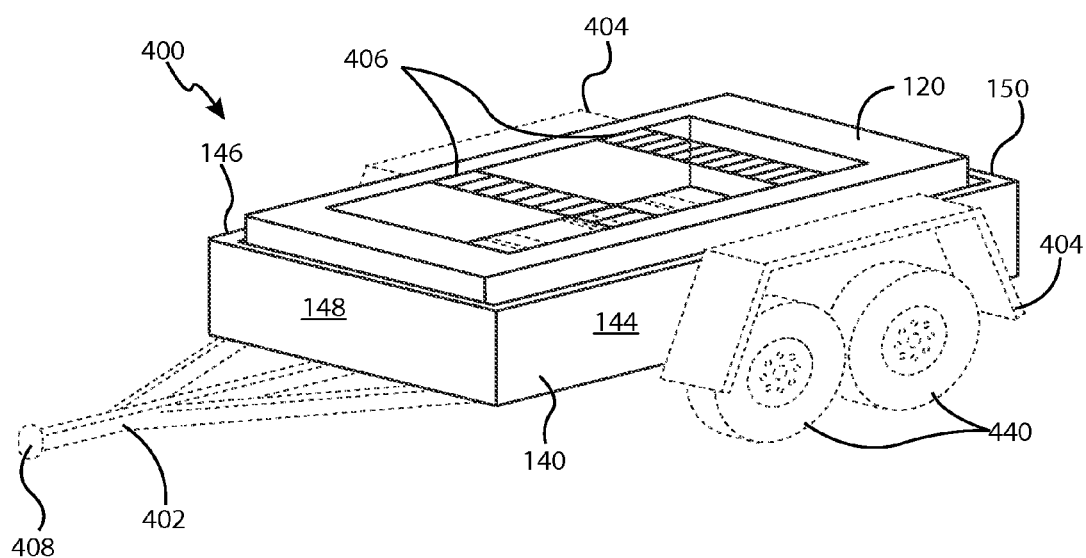
FIG. 4 is a front elevated view of a self containment system.

In an embodiment, FIG. 1 and FIG. 4 illustrate the self containment device 140 that can include a bed 142 (e.g., a bottom) having a width and a length, wherein the self containment device 140 can include a thickness 143 and hold a volume. On the plane for the width, a first end and a second end opposite thereto is included with the first end having a wall 146 extending in the vertical direction and the second end having a wall 144 extending in the vertical direction.

On the plane for the length (as illustrated in FIG. 4), a first end and a second end opposite thereto is included with the first end having a wall 148 extending in the vertical direction and the second end having a wall 150 extending in the vertical direction.

It is to be appreciated that the height of each wall can be substantially similar. In another example, each wall can include a respective height. A height (in the vertical direction) for the wall 144, the wall 146, the wall 148 and/or the wall 150 (also referred to as sidewalls of the self containment device 140) can be any suitable height that is selected with sound engineering judgment and/or ordinary skill without departing from the scope of the subject innovation. For instance, an embodiment can include having differing heights for each wall, same heights for a pairings of the walls, same heights for three of the walls, or a combination thereof. The self containment device 104 can include one or more thickness 143 for the bed 142, the wall 144, the wall 146, the wall 148, and the wall 150. Yet, it is to be appreciated and understood that the self containment device 140 can be any suitable size, shape, and/or dimension in order to house the machine 110, the fuel storage 120 and/or the fuel line 130. The volume created by the self containment device 140 can be such that it will surround and hold at least one of the machine 110 or the fuel storage 120.

For instance, a splash guard can be included with the self containment device 140. The splash guard can be used to provide at least one of the following: prevention of material (from at least one of the fuel storage 120 or machine 110) from existing the self containment device 140; or prevention of environmental weather conditions (e.g., rain, sleet, snow, wind, and the like) exterior elements (e.g., dirt, leaves, branches, mud, grass, animals, and the like) from entering the self containment device 140; or increased safety features to eliminate possible entry into the self containment device 140. For example, a splash guard can prevent a person from placing an appendage into the self containment device 140 that may contain material from the fuel storage 120 or the machine 110.

The splash guard can cover or close a gap that may exist between the fuel storage 120 and the self containment device 140. The splash guard can be affixed around the perimeter on a top portion of the self containment device 140 to cover the gap. In another example, the splash guard can be affixed to the top portion of the fuel storage 120 to cover a gap. In yet another example, the splash guard can be around the perimeter of the self containment device 140 and can be affixed to the top portion of the fuel storage 120 as well as the top portion of the self containment device 140.

In another example, an area in between the fuel storage 120 and underneath the machine 110 can be covered or closed by a splash guard. In such example, the splash guard can be used to prevent material exiting the self containment device 140 as well as, or in the alternative, prevent environmental weather conditions from entering the self containment device 140. It is to be appreciated that one or more splash guards can be used with the subject innovation. For instance, a splash guard can be used around the top perimeter of the self containment device 140 and a splash guard can be used in between the fuel storage 120 and/or underneath the machine 110 (when placed above the fuel storage 120).

In an embodiment, the splash guard can encase a gap or opening of the fuel storage 120 and/or machine 110 with an upper wall (not shown) extending upward and toward a center point located on the bed 142 and around the perimeter of the bed 142. In another example, the splash guard can be affixed to the top portion of the fuel storage 120 and extend downward at an angle toward the top portion of the self containment device 140. The splash guard can be fabricated from any suitable material such as, but not limited to, a cloth, a rubber, a steel, a metal, an alloy, a composite material, or any combination thereof. In another embodiment, the splash guard can be hinged to allow the splash guard to move from one position to a second position, wherein the first position covers a gap or opening associated with the self containment device 140 and the second position exposes such gap or opening.

It is to be appreciated that the self containment device 140 can be fabricated from any suitable material such as, but not limited to, a composite material, steel, iron, aluminum, synthetic material, plastic material, metal, a combination thereof, among others.

Figure 2:
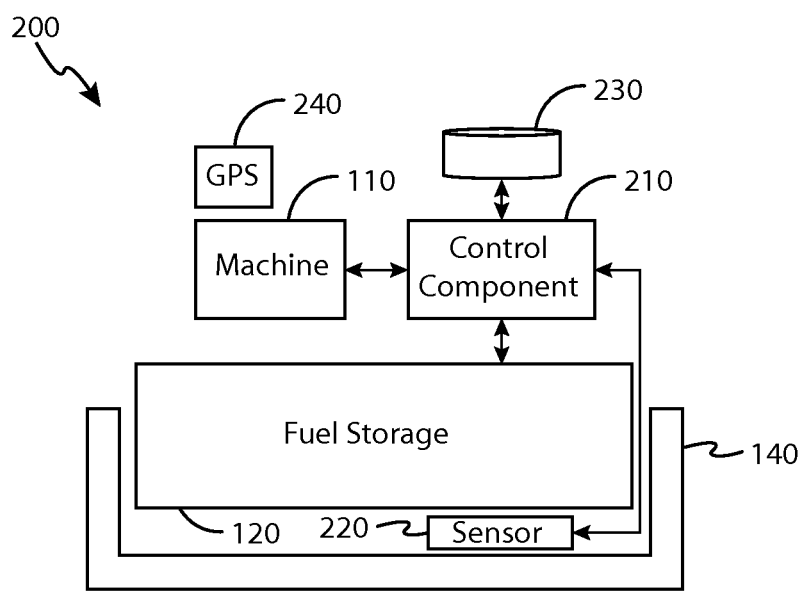
FIG. 2 is an illustration of an embodiment of a system for containing and detecting a portion of liquid from a machine.

FIG. 2 is a system 200 for containing and detecting a portion of liquid from the machine 110. The system 200 includes a control component 210 that is configured to manage at least one of a sensor 220, the machine 110, or the fuel storage 120. The sensor 220 can be configured to detect in situ a portion of liquid or material within the self containment device 140. The sensor 220 can further detect a portion of the liquid or material within the self containment device 140 in real time. In particular, the sensor 220 can detect material or liquid captured from the machine 110 and/or the fuel storage 120. Based on the detection of a portion of liquid or material by the sensor 220, the control component 210 can activate or deactivate at least the machine 110. It is to be appreciated that the system 200 can utilize one or more sensors 220 to detect at least one of the portion of the liquid (e.g., from the machine 110 and/or the fuel storage 120) or material (e.g., from the machine 110 and/or the fuel storage 120), or one or more parameters. The one or more parameters can be associated with at least one of the machine 110 (e.g., RPM, run time of machine, fuel consumption, quality of the seal of connections for a pump, RPM, pump rate, fuel level, GPS location, whether the machine 110 is operating, among others), the fuel storage 120, an environment of the system 200 (e.g., air, weather, ground, temperature, etc.), a trailer used with the self containment device 140, the vehicle used to move or tow the trailer coupled to the self containment device 140, among others.

In an embodiment, the system 200 can include a first sensor 220 and a second sensor. The first sensor 220 can be used within the self containment device 140 to detect a portion of liquid or material captured from the machine 110 and/or the fuel storage 120, whereas the second sensor can be on an exterior of the system 200 used to detect an environment condition such as weather. For instance, the second sensor can detect rain which could be used by the control component 210 to determine that the first sensor 220 detecting a portion of liquid could be due to the rain detected by the second sensor. In other words, the second sensor can be used to verify a detection by the first sensor 220 that such detection is not from an environment condition (e.g., rain, sleet, snow, etc.). In another example, the second sensor can be used to control use of a splash guard component. For instance, upon detection of the environment condition via the second sensor, the control component 210 can activate one or more splash guard components to protect the self containment device 140 from collecting the environment condition.

In another embodiment, the system 200 can include the first sensor 220 and the second sensor as described in the above embodiment. Moreover, the control component 210 can control the drain 160 based on the readings or signals received from the one or more sensors. For instance, the detection of an environment condition from the second sensor can initiate the control component 210 to activate the drain 150 (shown in FIG. 1) to allow environmental condition material or liquid to be removed from the self containment device 140 after a duration of time from detection from the second sensor and where the drain 150 is activated for a duration of time to remove the material or liquid (and closed after such duration of time). In such instance, the first sensor 220 can detect a liquid which can be verified to be from the environment condition and to not include a liquid or material from the machine 110 and/or fuel storage 120.

The system 200 can utilize one or more sensors for control and/or operation. For instance, upon a detection from the sensor 220, the control component 210 can deactivate the machine 110 (e.g., shutting off the fuel line 130, using a kill switch, etc.). In another example, based on the detection of a portion of liquid or material by the sensor 220, the control component 210 can control a parameter of the machine 110, wherein the parameter can be, but is not limited to, a revolutions per minute (RPM) of the machine 110, a pump rate for the machine 110, a source of power (e.g., battery, energy storage device, motor, and the like), a float setting (e.g., float used to determine whether the machine 110 is activated or deactivated based on a level of liquid that is being pumped), an energy savings state of the machine 110, a safe mode for the machine 110, among others.

In another embodiment, the control component 210 can communicate a notification or alert based on a detection of a liquid or material via the sensor 220. For instance, the notification or alert can be an audible signal, a haptic signal, a visual signal, a wireless signal, an electronic signal, a combination thereof, and the like. For instance, a detection of a portion of liquid or a material can initiate the control component 210 to activate a light indicating liquid has been detected. In another embodiment, the control component 210 can communicate a wireless signal (e.g., text message, email, short message service (SMS) message, among others), wherein the signal can request an inspection, maintenance, repair, among others. Additionally, an embodiment can include control component 210 to communicate an electronic signal based on at least the sensor 220, wherein the electronic signal is communicated via wired, wireless, cable, LAN cable, among others.

For example, the control component 210 can communicate the signal (e.g., wired or wireless) based on the sensor 220 via a transmitter component (not shown) to a device, wherein the device receives the wireless signal. By way of example and not limitation, the device can be, but is not limited to being, any suitable device that controls a digital camera, a computer, a desktop machine, a tablet, a portable device, a portable digital assistant, a smartphone, a laptop, a computing device, a portable gaming device, a game console, a device that can access the Internet, a kiosk, a terminal, a display, a surface computing device, smart glass, a surface that interacts with a user's motion or touch, and the like.

The control component 210 can further store data related to the sensor 220 and sensor detection in a data store 220. For instance, upon detection of a portion of liquid or material, the control component 210 can actuate a storage of data in the data store. For instance, the data store 220 can store information related to the system 200 such as, but not limited to, a type of liquid detection, a material detected, a date of detection, a time of detection, a type of machine used during detection, a maintenance record history, an inspection maintenance history, a physical location of the system 200, a policy holder for a rental of the machine 110, a parameter related to the machine, a record (e.g., time, date, content, target number, target address, target email, and the like) associated with a target (e.g., entity, person, machine, device, computer, and the like) to communicate a signal, among others.

It is to be appreciated that the data store 230 can be, for example, either volatile memory or nonvolatile memory, or can include both volatile and nonvolatile memory. The data store 230 of the subject systems and methods is intended to comprise, without being limited to, these and other suitable types of memory. In addition, it is to be appreciated that the data store 230 can be a server, a database, a hard drive, a flash drive, an external hard drive, a portable hard drive, a cloud-based storage, a solid-state drive, a distributed storage system, and the like. The data store 230 can further be a local data store, a remote data store, a cloud-based data store, or a combination thereof.

Figure 3:
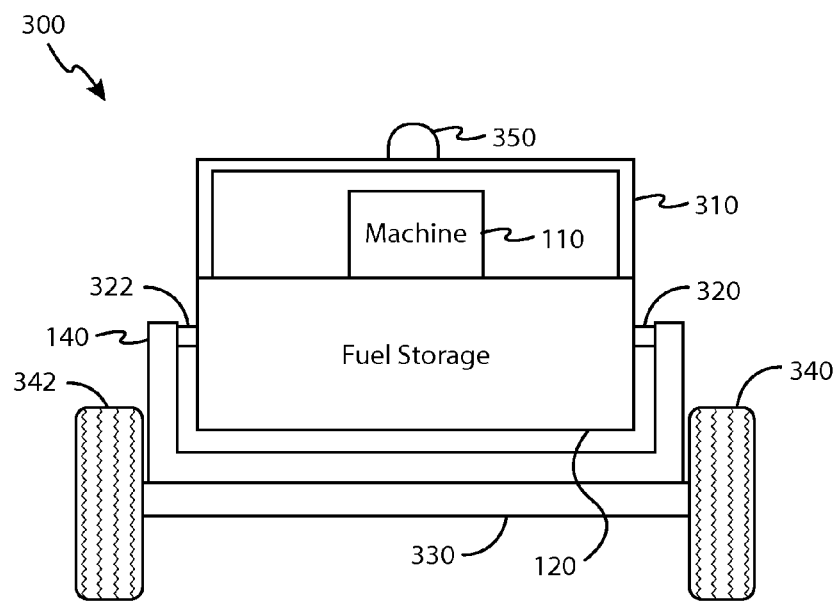
FIG. 3 is an illustration of an embodiment of a system for providing portable or stationary environmental containment for a machine.

FIG. 3 is a system 300 for providing portable or stationary environmental containment for a machine. The system 300 can include a support 310 that attaches to the fuel storage 120 (to which the machine 110 is attached). The support 310 can be used to move a portion of the system 300 via a crane, a pulley, a vehicle, a tractor, and the like. For example, the support 310 can include hook member 350 that can be used for transport or moving. For instance, the hook member 350 can be an eyelet, a hook, a receiver mount, a tow ring, and the like. In an embodiment, the fuel storage 120 can include a skid mount component on at least one of a bottom portion of the fuel storage 120 or a bottom portion of the self containment device 140. The skid mount component can facilitate moving the system 300. By way of example, the fuel storage 120 can include an eyelet to allow for moving, towing, dragging, etc. on the ground in which the one or more skid mount component can facilitate moving on the ground. It is to be appreciated that the eyelet can be similar to the hook member 350 but placed on a location on the fuel storage 120.

The fuel storage 120 can be releaseably or non-releaseably coupled to the self containment device 140. The machine 110 can be coupled to the fuel storage 120, wherein the coupling can be releasable or non-releaseable. In another embodiment, the machine 110 can be coupled to at least one of the fuel storage 120, the self containment device 140, or a frame (frame 402 in FIG. 4) of the trailer.

The fuel storage 120 can be attached or coupled to the self containment device 140 via a locking pin mechanism 320, wherein the locking pin mechanism can include a male part and a female part that receives the male to couple the fuel storage 120 to the self containment device 140. It is to be appreciated that any suitable number of locking pin mechanisms 320 can be utilized with the subject innovation. It is to be appreciated that any suitable connective means can be utilized to attach or couple fuel storage 120 to self containment device 140 and the subject innovation is not limited to the locking pin mechanism 320. By way of example and not limitation, a mount on the fuel storage 120 and/or a mount on the self containment device 140 can be used and coupled together with a bolt and nut. It is to be appreciated that any suitable mount can be used to couple the fuel storage 120 and self containment device 140 and any suitable means for connecting can be used without departing from the scope of the subject innovation. For example, the coupling can be provided by at least one of a weld, a screw, a bolt, a nut, a huck bolt, and the like. In one example, the fuel storage 120 can be removeably coupled to the self containment device 140. In another example, the fuel storage 120 can be coupled to the self containment device 140 permanently.

The system 300 can further include a frame (a frame 402 shown in FIGS. 4-9), an axle 330 having a first end opposite a second end, wherein the first end includes a first wheel 340 and the second end includes a second wheel 342. The axle 330 and the wheels 340, 342 can be utilized to allow portability to the system 300, wherein the portability is based on a trailer use or towing aspect with a vehicle (not shown). It is to be appreciated that the system 300 can include any suitable number of axles and/or wheels. For instance, the system 300 can include a first axle and a second axle, each having respective set of wheels.

The system 300 can be utilized in both a secondary containment as well as without a secondary containment based on having the self containment device 140 inclusive. In other words, the portability of the system 300 allows transport to a stationary secondary containment that is on site. In another example, the system 300 can be used without a stationary secondary containment due to the inclusion of the self containment device 140 which affords protection. In still another embodiment, the diesel machine 110 and fuel storage 120 can be detached from the self containment device 140 via the locking pin mechanism 320 (or other connective means) and moved (e.g., via the support 310) to a secondary containment location. Thus, the system 300 provides flexibility in selecting a location for the diesel machine 110 rather than being dependent on stationary secondary containment locations which can be costly to build, move, and/or relocate. For instance, if stationary secondary containment locations are filled by other machines, the system 300 can be used without a secondary containment based on use of the self containment device 140.

For instance, the self containment device 140 can be utilized as a skid mount. In such example, a skid mount component(s) can be configured to the diesel machine 110 and/or fuel storage 120 such that the diesel machine 110, fuel storage 120, and skid mount component(s) can be a stand-alone unit that is mobile and that provides protection to the environment from material consumed or used by the diesel machine 110. Thus, the skid mount component(s) allow the diesel machine 110 and/or the fuel storage 120 to be utilized without the secondary containment. Moreover, the skid mount component(s) can be included such that when housed within the self containment device 140, an additional layer of protection is provided. In other words, the skid mount component can provide a skid mount protection layer (not shown) to prevent material exposure to the environment and the self containment device 140 can provide an additional layer of protection when the skid mount, diesel machine 110 and fuel storage 120 are housed or coupled to the self containment device 140. It is to be appreciated that the skid mount component(s) may be an additional layer of protection while configured within the self containment device 140 and/or allow flexibility to use the diesel machine and fuel storage 120 without secondary containment in an environment (when removed or decoupled from the self containment device 140).

The self containment device 140 can have boundary that defines a volume. The fuel storage 120 can have boundary that defines a volume. The machine 110 can also have a boundary that defines a volume. It is to be appreciated that the boundaries of the machine 110 and/or the fuel storage 120 are within the boundary of the self containment device 140.

FIGS. 4-10 illustrate various aspects of the claimed subject matter. FIG. 4 illustrates a front elevational view of a self containment system without a machine shown. Fuel storage 120 can be releaseably coupled to the self containment device 140 and the self containment device 140 can be coupled to a frame 402 of a trailer self containment system 400. As discussed above, a machine (machine 110 shown in FIGS. 1-3) can be coupled to the fuel storage 120. For instance, the machine 110 can be coupled (e.g., releaseably or non-releaseably) to one or more supports 406 coupled to the fuel storage 120. In an embodiment, the machine 110 is bolted to the supports 406, wherein the supports 406 are welded to the fuel storage 120. In another embodiment, the machine 110 is welded to the supports 406 which are also welded to the fuel storage 120. The trailer self containment system 400 includes wheels 440 and a wheel well 404. Additionally, the trailer self containment system 400 can include a hook member 408 that be used for transport or moving the trailer, the self containment device 140, the fuel storage 120, the machine 110, among others. For instance, the hook member 350 can be an eyelet, a hook, a receiver mount, a tow ring, and the like.

The trailer self containment system 400 can further include one or more step members 502, 504. A first step member 502 can be included on a driver side that is positioned between the wheel well 404 and the self containment device 140. For instance, the first step member 502 can be on a front side of the wheel well 404 and/or the rear side of the wheel well. It is to be appreciated that the first step member 502 can be on one or both sides of the trailer self containment system 400. The first step member 502 can be formed from a bar (having a first end and a second end opposite thereto) being placed in between the wheel well 404 and the self containment device 140 with the first end connected to the wheel well 404 and the second end connected to the self containment device 140. A second step member 504 can be included on the trailer self containment system 400, wherein the second step member 504 is positioned on the support 310. For example the second step member 504 can be used as a handle or a step. The second step member 504 can be positioned on a side of the support 310 or both sides of the support 310. For example, the second step member 504 can be triangle in shape such that the support 310 is one side of the triangle and the second step member 504 is the other two sides of the triangle.

Figure 6:
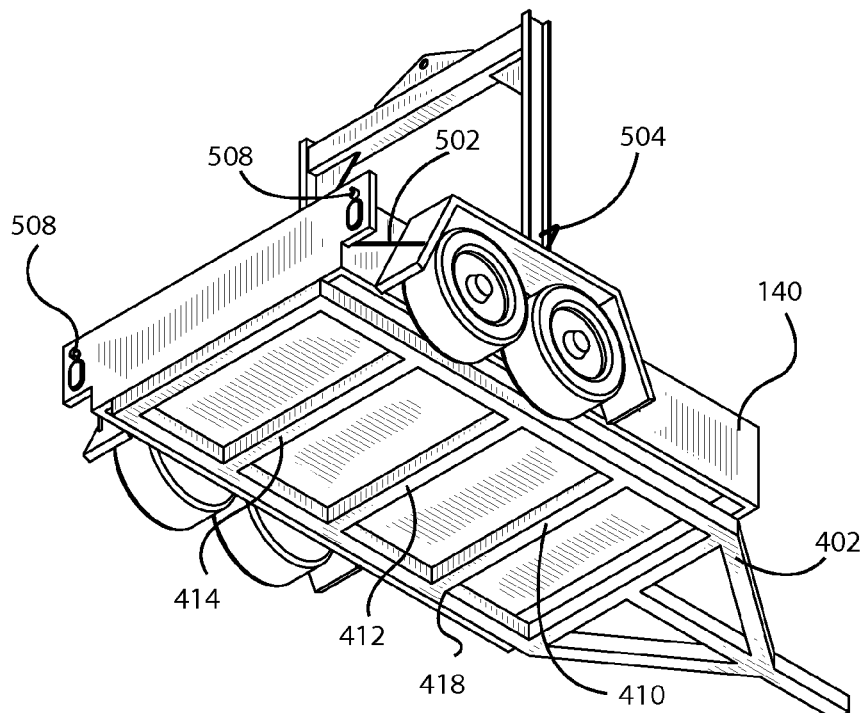
FIG. 6 illustrates a perspective bottom view of the self containment system.

Turning to FIG. 6, the trailer self containment system 400 can include the frame 402 with one or more support rails 410, 412, and 414 (collectively referred to as one or more support rails), wherein the frame 402 includes a box support 418. The box support 418 can include one or more support rails 410, 412, and 414 that connect across the box support 418 to provide support for at least one of the self containment device 140, the fuel storage 120, the machine 110, the support 310, the axle 330, or one or more wheels (e.g., wheels 340, 342).

The subject innovation can further include a battery compartment 506 that stores a battery used with the machine 110. The battery compartment 506 can include a top lid and a bottom that can allow opening and closing thereof. The battery compartment 506 can further include a locking mechanism to secure the top lid to the bottom. In an embodiment, the locking mechanism can receive a padlock.

The subject innovation can utilize a textured coating, wherein the textured coating is a durable, abrasive-resistant, non-skid finish. By way of example, the textured coating can be polyurethane, among others. The texture coating on at least one of the self containment device 140, the fuel storage 120, the machine 110, the trailer, the frame 402, the wheel well 404, among others. In another embodiment, the texture coating can be placed on a selected area or portion of at least one of the self containment device 140, the fuel storage 120, the machine 110, the trailer, the frame 402, the wheel well 404, among others. For instance, a selected area of the wheel well 404 can include a textured coating.

The subject innovation can further include a license plate light 508 that is protected by a shield. The shield can protect the license plate light 508 during travel or transport. Moreover, the license plate light 508 can be affixed to a rear portion of at least one of the frame 402, the fuel storage 120, the machine 110, the self containment device 140, or a wheel well 404.

Figure 5:
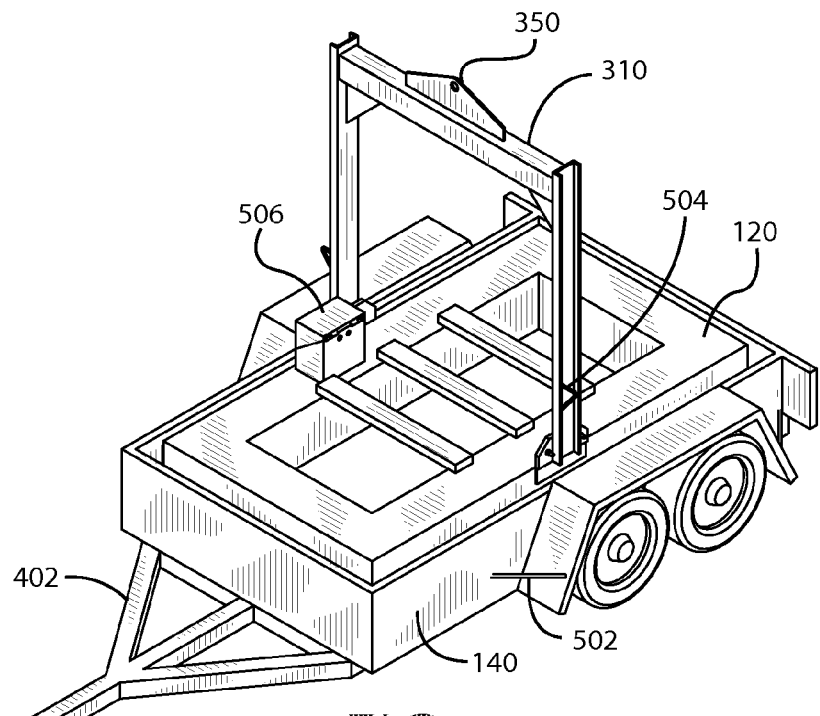
FIG. 5 illustrates a perspective top view of the self containment system.
Figure 7:
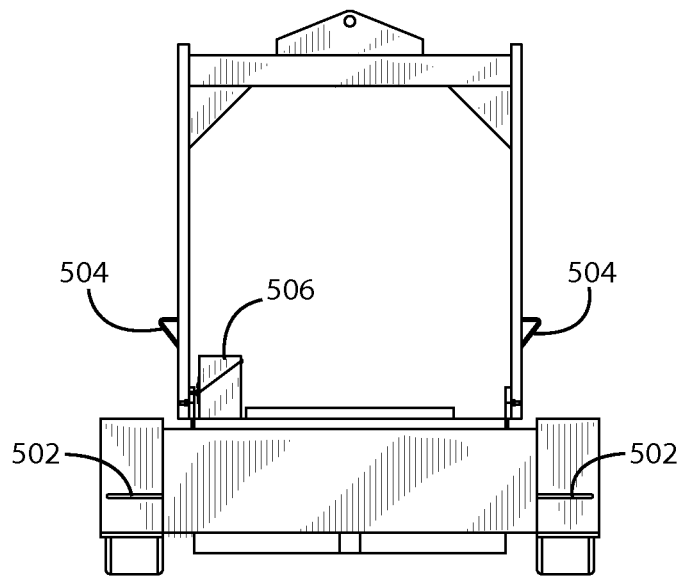
FIG. 7 illustrates a front view of the self containment system.
Figure 8:
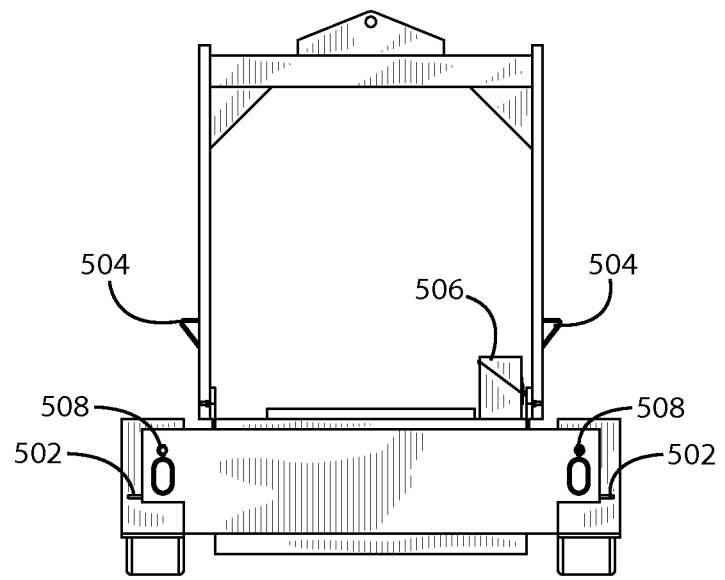
FIG. 8 illustrates a rear view of the self containment system.
Figure 9:
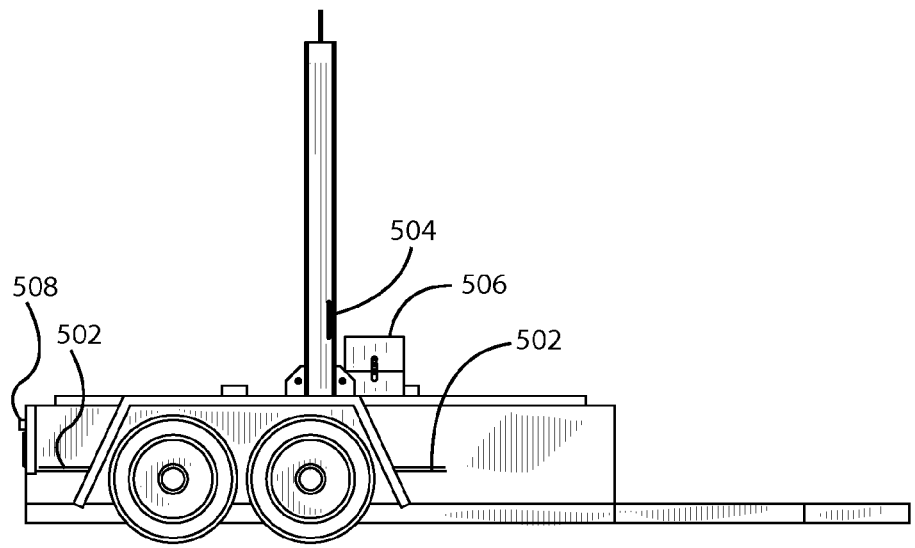
FIG. 9 illustrates a left side view of the self containment system.
Figure 10:
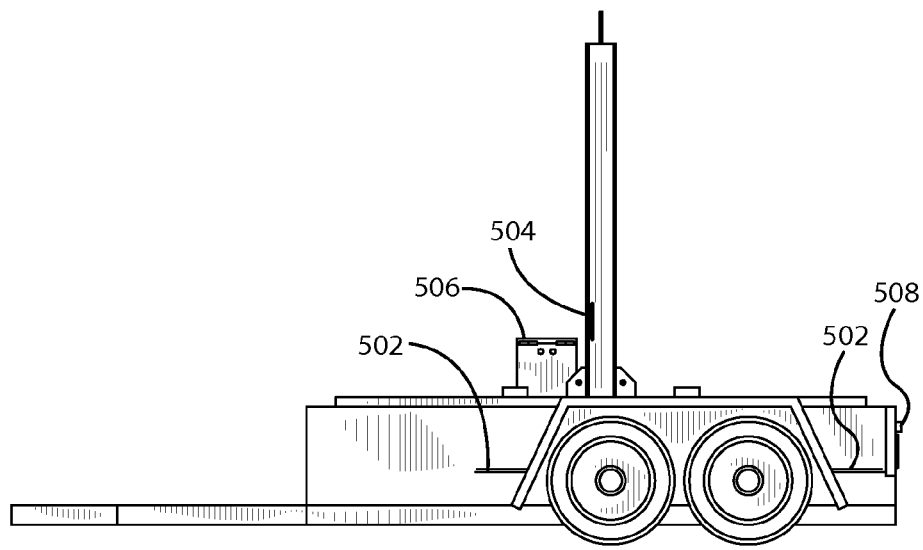
FIG. 10 illustrates a right side view of the self containment system.
Figure 12:
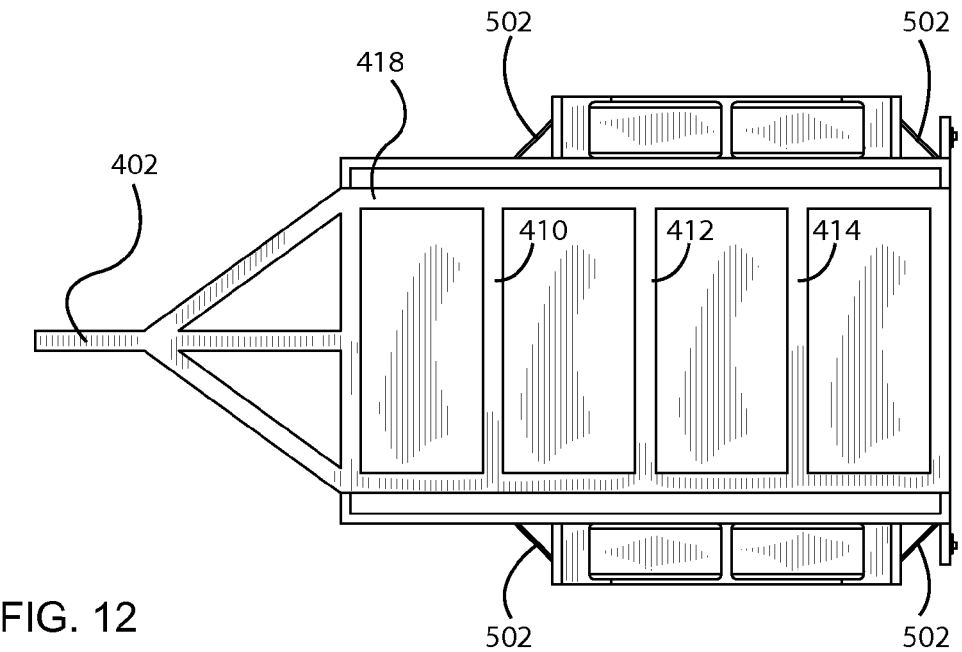
FIG. 12 illustrates a bottom view of the self containment system.
Figure 11:
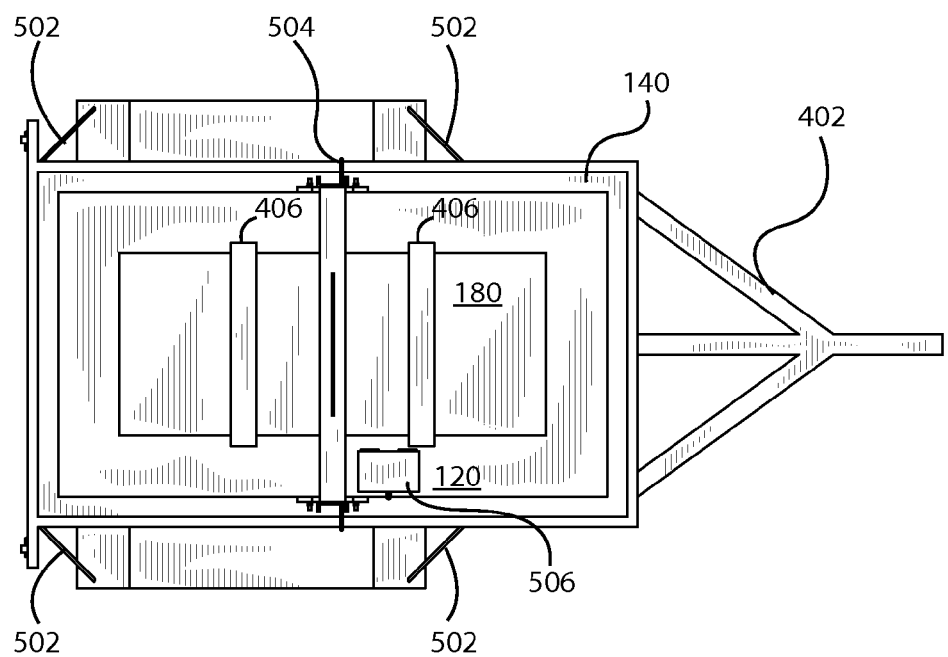
FIG. 11 illustrates a top view of the self containment system.

FIG. 5 illustrates a perspective top view of the self containment system. FIG. 6 illustrates a perspective bottom view of the self containment system. FIG. 7 illustrates a front view of the self containment system. FIG. 8 illustrates a rear view of the self containment system. FIG. 9 illustrates a left side view of the self containment system. FIG. 10 illustrates a right side view of the self containment system. FIG. 11 illustrates a top view of the self containment system. FIG. 12 illustrates a bottom view of the self containment system.

The aforementioned systems, components, (e.g., self containment device 140, control component 210, sensor 220, data store 230, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In an embodiment, a system can include a drain coupled to the self containment device to allow a controlled release of a portion of liquid captured within the self containment device. In the embodiment, the self containment device is substantially enclosed from an atmosphere. In an embodiment, a system can include an axle with a first end and a second end, wherein the second end is opposite the first end and a first wheel coupled to the first end and a second wheel coupled to the second end. The system can further include a frame coupled to the axle and a tow mechanism coupled to the frame. Moreover, the self containment device can be coupled to the frame. In an embodiment, a system can include a locking pin mechanism that couples the fuel storage to the self containment device.

In an embodiment, a system can include a sensor that is configured to detect a portion of liquid captured in the self containment device and a control component that is configured to deactivate the diesel machine based upon a detection of the portion of liquid. In the embodiment, the control component is further configured to communicate a notification that the portion of liquid is detected, wherein the notification is an email, a visual notification, a haptic alert, an audible alert, a cellular communication, or a wireless transmission. In the embodiment, the control component is further configured to determine a type of the portion of liquid detected. In the embodiment, the system can include a data store that stores a date, a time, the type of liquid detected.

In an embodiment, a system can include a Global Positioning System (GPS) component that is configured to communicate a geographic location via at least one satellite to track a position of at least one of the diesel machine or the fuel storage.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A trailer system that facilitates containing a liquid from a machine, comprising:
   a fuel storage that includes a volume that houses a portion of fuel;
   a machine that consumes the portion of fuel to operate or run;
   a fuel line that communicates the portion of fuel from the fuel storage to the machine;
   a self containment device that is leak-proof and houses the fuel storage and the machine such that a liquid or a material from at least one of the machine or the fuel storage is contained therein;
   a first sensor that is configured to detect the liquid or the material in the self containment device; and
   a control component that is configured to receive a signal from the first sensor representative of a detection of the liquid or the material wherein the control component controls a parameter associated with the machine based on the signal from the first sensor.

2. The system of claim 1, further comprising a drain coupled to the self containment device to allow a controlled release of a portion of liquid captured within the self containment device.

3. The system of claim 1, wherein the self containment device is substantially enclosed from an atmosphere.

4. The system of claim 1, further comprising:
   an axle with a first end and a second end, wherein the second end is opposite the first end;
   a first wheel coupled to the first end and a second wheel coupled to the second end;
   a frame coupled to the axle;
   a tow mechanism coupled to the frame; and
   the self containment device coupled to the frame.

5. The system of claim 1, further comprising a locking pin mechanism that couples the fuel storage to the self containment device.

6. The system of claim 1, wherein
the control component is configured to deactivate the machine based upon a detection of the liquid or the material.

7. The system of claim 1, wherein the control component is further configured to communicate a notification that the portion of liquid is detected, wherein the notification is an email, a visual notification, a haptic alert, an audible alert, a cellular communication, or a wireless transmission.

8. The system of claim 1, wherein the control component is further configured to determine a type of the portion of liquid detected.

9. The system of claim 1, further comprising a data store that stores a date, a time, the type of liquid detected.

10. The system of claim 1, further comprising a Global Positioning System (GPS) component that is configured to communicate a geographic location via at least one satellite to track a position of at least one of the machine or the fuel storage.

11. A trailer system, comprising:
a trailer having a frame, at least one axle with wheels, and a hook member for moving the trailer;
a rectangular fuel storage coupled to a portion of the frame, the rectangular fuel storage includes a volume that stores a fuel, and the rectangular fuel storage includes a four inch in diameter fuel port to receive the fuel;
a machine coupled to the fuel storage that consumes the fuel to operate;
a fuel line that communicates the fuel from the rectangular fuel storage to the machine;
a self containment device having two sidewalls opposite thereto on a length and two sidewalls opposite thereto on a width, each of the sidewalls having a height,
the self containment device and the sidewalls create a boundary that defines a volume, wherein the self containment device is impermeable to a liquid or a material used by the machine; and
the rectangular fuel storage is situated inside the boundary of the self containment device to prevent the liquid or the material from leaving the self containment device;
a first sensor that is configured to detect the liquid or the material in the self containment device; and
a control component that is configured to receive a signal from the first sensor representative of a detection of the liquid or the material wherein the control component controls a parameter associated with the machine based on the signal from the first sensor.

12. The system of claim 11, wherein the machine is a diesel fuel pump.

13. The system of claim 11, wherein the parameter is an operation of the machine.

14. The system of claim 11, wherein the parameter is a revolutions per minute (RPM) of the machine.

15. The system of claim 11, further comprising:
the first sensor being situated within the self containment device;
a second sensor being situated exterior to the self containment device; and
the control component is further configured to receive a signal from the second sensor representative of an environmental condition, wherein the control component activates a drain integrated into the self containment device to remove the environmental condition.

16. The system of claim 15, wherein the control component verifies the signal from the first sensor prior to activating the drain.

17. The system of claim 11, further comprising a battery box coupled to a portion of the fuel storage that contains a battery used with the machine.

18. A trailer system, comprising:
a trailer having a frame, at least one axle with wheels and at least one wheel well, and a hook member for moving the trailer;
a rectangular fuel storage coupled to a portion of the frame, the rectangular fuel storage includes a volume that stores a fuel, and the rectangular fuel storage includes a four inch in diameter fuel port to receive the fuel;
a machine coupled to the fuel storage that consumes the fuel to operate;
a support member, coupled to the rectangular fuel storage, having a hook member;
a fuel line that communicates the fuel from the rectangular fuel storage to the machine; and
a self containment device having two sidewalls opposite thereto on a length and two sidewalls opposite thereto on a width, each of the sidewalls having a height,
the self containment device and the sidewalls create a boundary that defines a volume, wherein the self containment device is impermeable to a liquid or a material used by the machine;
the rectangular fuel storage is situated inside the boundary of the self containment device to prevent the liquid or the material from leaving the self containment device;
a first sensor that is configured to detect the liquid or the material in the self containment device;
a control component that is configured to receive a signal from the first sensor representative of a detection of the liquid or the material wherein the control component controls a parameter associated with the machine based on the signal from the first sensor;
a first step member connected between the at least one wheel well and a side of the self containment device; and
a second step member connected to a side of the support member.

19. The system of claim 1, further comprising a battery box coupled to a portion of the fuel storage that contains a battery used with the machine.

20. The system of claim 11, wherein the self containment device is substantially enclosed from an atmosphere.